United States Patent Office 2,946,438
Patented July 26, 1960

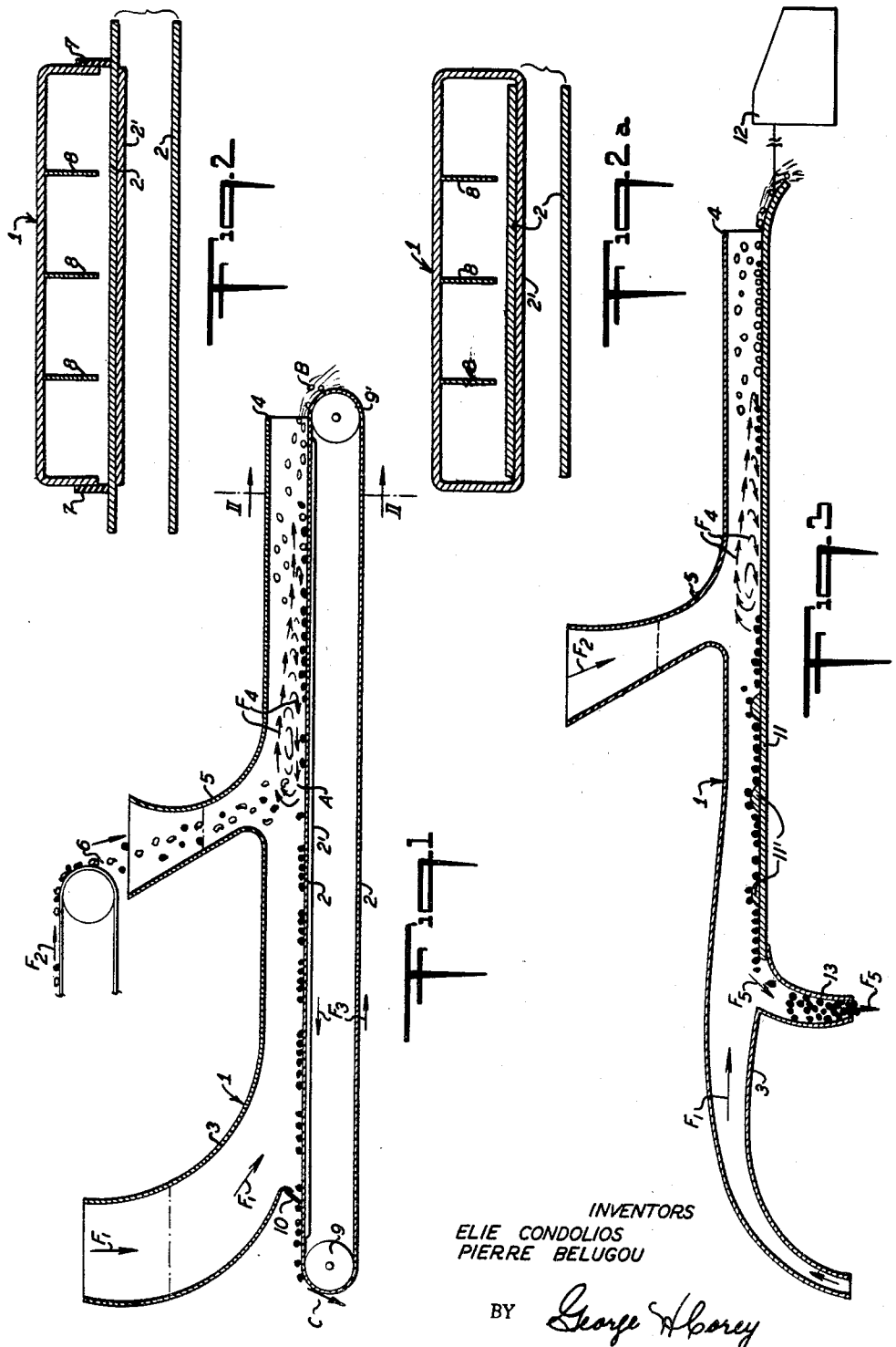

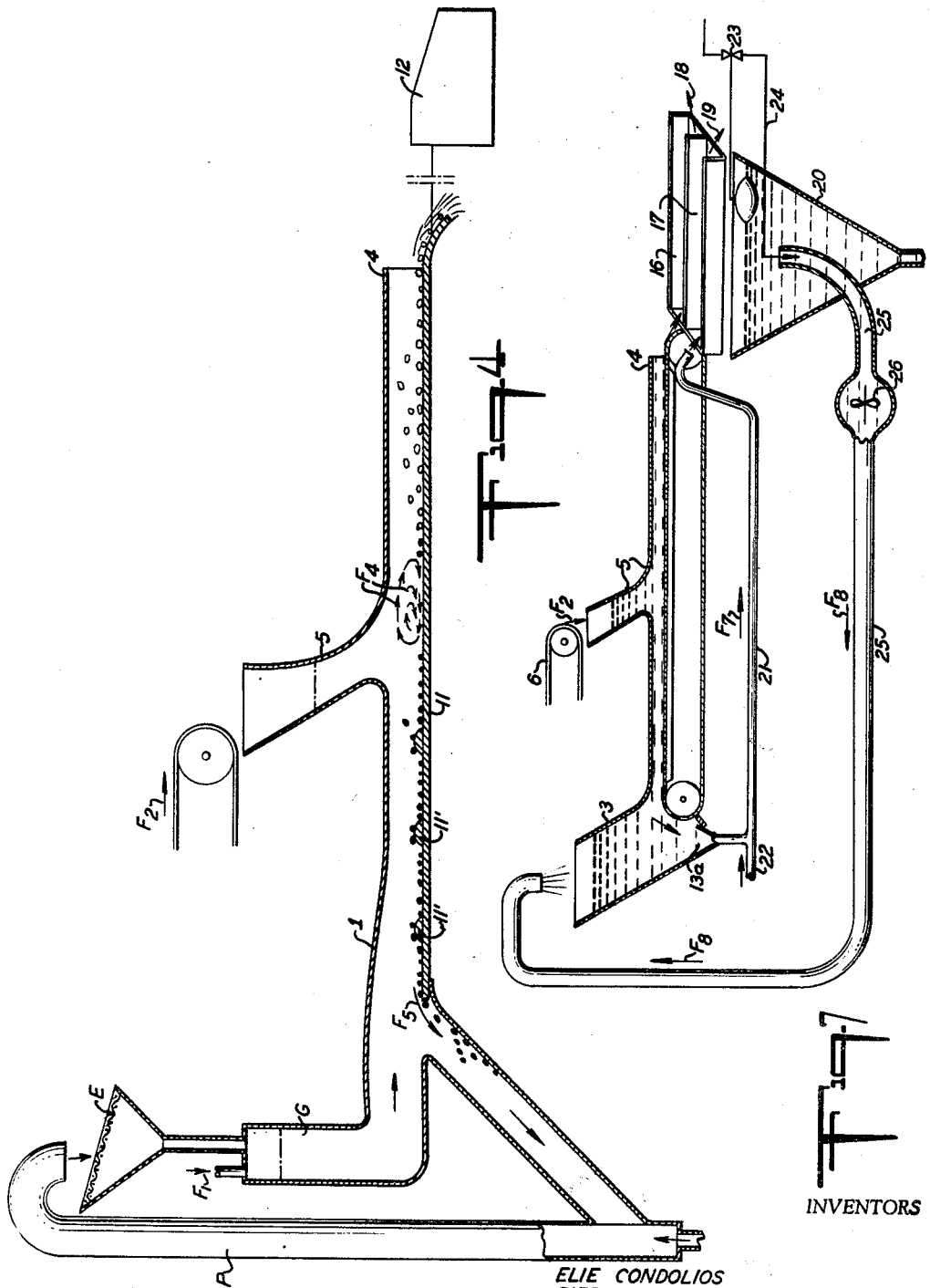

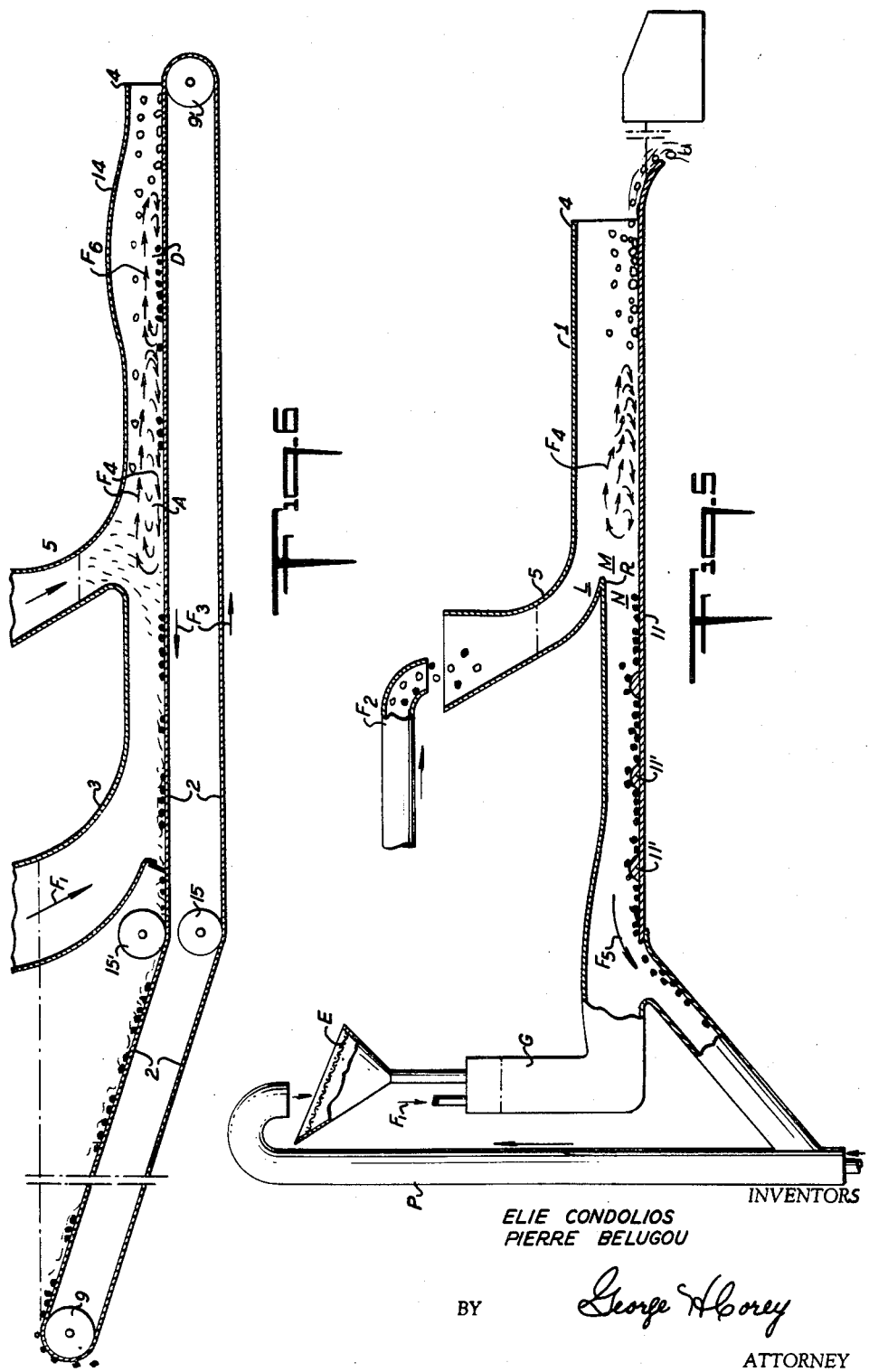

2,946,438

PROCESS AND APPARATUS FOR THE SEPARATION OF SOLID PARTICULATE MATERIALS OF DIFFERENT DENSITIES AND/OR DIFFERENT PARTICLE SIZES

Pierre Belugou, Paris, and Elie Condolios, Grenoble, France, assignors to Charbonnages de France, Paris, France, a public institution of France, and Etablissements Neyrpic, Grenoble, France, a corporation of France Filed Nov. 23, 1956, Ser. No. 623,830

Claims priority, application France Nov. 25, 1955

17 Claims. (Cl. 209—156)

The present invention has for an object a process and apparatus for sorting of solid materials according to the differences in the relative densitites of the particles thereof or the differences in the sizes of the particles or a combination of these two characteristics of the material which is subjected to the sorting treatment. More particularly, the invention relates to a process of sorting and to an apparatus especially adapted for use therewith of the general type wherein sorting is conducted in a closed conduit through which a fluid, either liquid of gaseous, is passed under a suitable hydraulic or pneumatic head at a velocity of flow appropriately regulated with relation to the other operating conditions to insure that a solid particulate material that is to be subjected to the sorting treatment and which is introduced into the flow at a point intermediate the length of the conduit will tend to form itself into at least one dune on the bottom surface of the conduit, such dune being constantly agitated and stirred within itself under the action of the passing current and due to the differences in the densities or sizes of the particles of the solid material.

According to the present invention, the dune or dunes formed on the bottom surface of the conduit, or on an appropriate supporting surface adjacent the bottom of the conduit, are maintained substantially stationary through provision of suitable means for bodily moving the dune in the upstream direction either intermittently or continuously in coordinated relation to the velocity of flow of the passing fluid, the velocity of flow of the fluid being so regulated with regard to the respective mean velocity limits of deposit of the constituents that are to be separated into predetermined fractions or cuts of the crude material that a sorting action will take place. By so operating and maintaining the dune substantially stationary as aforesaid, the operation can be carried on continuously with the constituents of the respective predetermined fractions escaping from the opposite sides of the dune, the lighter or smaller particles escaping to the downstream side and being carried along to the outlet of the conduit or other suitable point of discharge on the downstream side of the dune and the heavier or larger particles separating from the stationary dune being carried in the intermittent or continuous movements of the conduit bottom section or a separate supporting surface positioned therein in the upstream direction along the conduit to a suitable point of withdrawal.

The velocity limit of deposit of any solid particulate material whatsoever to which reference is made herein for a predetermined velocity or rate of fluid flow may be taken as that velocity above which a particular material becomes positively entrained by the flow, either by saltation, that is to say, by making successive leaps or bounds, or by suspension, that is to say, by becoming a part of the fluid flow.

Various forms of execution of the invention are hereinafter described, by way of example, with reference to the annexed drawings, in which:

Fig. 1 is a schematic view in longitudinal section of an apparatus according to the invention with the bottom of the conduit formed by a traveling belt type conveyor;

Fig. 2 represents a transverse section of the same apparatus according to line II—II of Fig. 1;

Fig. 2a is a similar transverse section as Fig. 2 but wherein the traveling belt moves within a conduit provided with a bottom wall section integral with the sides and top wall of the conduit;

Fig. 3 is a schematic view in longitudinal section of another form of the apparatus wherein the bottom of the conduit is movable bodily in an alternate back and forth direction;

Fig. 4 is a schematic view in longitudinal section of another embodiment of the apparatus invention wherein the bottom feature is similar to that of Fig. 3 but wherein means is provided for compensating for variations of the quantity of water withdrawn with the various separated products;

Fig. 5 is a schematic view in longitudinal section of a further modification of the apparatus which takes the general form of that shown in Fig. 4 except that the crude material to be separated is fed to the sorting conduit by hydraulic means;

Fig. 6 represents a schematic view in longitudinal section of a modified form of the apparatus of Fig. 1 wherein the travelling conveyor is provided with an upwardly inclined section extending in the upstream direction beyond the confines of the conduit for withdrawing the heavier fraction in a dewatered condition; and Fig. 7 is a schematic layout of a washing circuit for coal particles utilizing a typical embodiment of the apparatus according to the invention.

In the various forms of the apparatus which are hereinafter described, the sorting is conducted densimetrically. With the apparatus shown, the materials that are to be sorted will therefore be advantageously chosen so as to be susceptible of being entrained by saltation, which is in fact the case with most materials of a sufficient grain size, but apparatus according to the invention is applicable also to granulometric sorting and for this purpose the materials will be advantageously chosen for their susceptibility of being entrained by suspension which is in fact the case for most of the sufficiently fine solid materials. Furthermore, the fluid used in the operations described in the following description is generally liquid but, it will be understood, it can be gaseous in certain applications.

According to Figs. 1 and 2 the conduit is formed into two sections. One section 1 comprises the side walls and top wall and the other, or lower part, is formed by a travelling belt type conveyor 2. The height of the conduit or distance between the upper plane or top wall of the conduit and the travelling belt is substantially constant throughout the length of the conduit except at the point of feeding in of the water and the point of entry of the crude materials, as will be explained further hereinafter. A feeding tank 3 fed with water at constant discharge is connected to the conduit, and the water flowing therefrom (arrow $F_1$) under a predetermined head sets up a current toward the downstream point 4. Toward the middle of the conduit a hopper is provided for feeding in the crude materials supplied by a feeder 6 (arrow $F_2$) or another suitable arrangement.

A sealing contact between the depending side walls of the upper conduit section or envelope 1 and the upper surface or the marginal edges of the travelling conveyor 2 is maintained by means of suitable rubber bibs 7. The envelope 1 may advantageously be divided into separate chambers with the aid of longitudinally-extending hanging partitions 8 which extend throughout all or part of the length of the conduit, the object of these partitions being to avoid parasitic or eddy currents in the fluid flow. It is not necessary that the partitions 8 be in contact with the upper surface of the travelling conveyor 2.

The conveyor 2 can be activated through a movement of translation (of which the direction is indicated by the arrow $F_3$) by means of a driven pulley 9 and an idling or return pulley 9'. The upper surface of the conveyor 2 reposes on a plane surface 2', assuring contact of the upper surface with the bibs 7.

By way of modification (Fig. 2a) the conduit may be closed on the bottom side by a wall section 2' integral with the lateral faces of the envelope 1 thus forming a conduit of closed contour and on the bottom of which the upper run of the belt conveyor 2 travels. Furthermore, it is to be noted that the bottom of the conduit may be plane or otherwise. It can likewise be horizontal or slightly inclined with an inclination that can be varied, preferably decreasing in the downstream part, which favors the contact of the travelling belt or run of the conveyor with the bottom of the conduit.

The operation of the apparatus is as follows: As has been said earlier, the vat 3 is fed in such manner as to insure a constant discharge of water therefrom, so that the velocity of the current or flow of water through the conduit is higher than that which is necessary to commence to entrain the lighter particles into the liquid current but below that which is necessary for entraining the heavier particles. In choosing this velocity one takes into account among other things the density of the lighter particles and the density of the heavier particles falling within the fractions that it is intended to produce in the sorting operation.

The traveling conveyor 2 is given a movement such that its upper run moves at a constant velocity, but slowly, from the downstream toward the upstream end of the conduit.

The crude materials to be sorted are introduced with the aid of a feeder 6 into the hopper 5 in a continuous manner. There forms in the zone A downstream from the hopper 5 a dune of the materials which through a combination of the movement of the liquid current and the movement of the conveyor is agitated with a constant rubbing or stirring movement in the direction of the arrows $F_4$. There escapes from this dune in the downstream direction the lighter particles which are entrained by the current of water passing downstream toward the outlet end of the conduit and these are discharged at B with the current of water and separated from the water in any suitable manner. On the other side, the heavier material is entrained by the movement of the conveyor in spite of the direction of the current of water $F_1$ toward the upstream end of the conduit. They pass out past the fixed bib 10 attached to the wall of the tank 3 and are discharged at C with a feeble current of water corresponding to the leakage that may be tolerated at this point.

Fig. 3 shows another form of possible realization of the invention in which the material-supporting member 11 disposed at the bottom side of the conduit is supported for movement in an alternate back and forth manner in a plane generally parallel to the length of the conduit. The apparatus according to this figure is constituted of an inverted trough-shaped member or envelope 1 with three faces which communicates at one end with a vat or tank 3 which supplies water under a suitable head. A hopper 5 for feeding in the crude materials is connected to the conduit at a point intermediate its ends. The envelope 1 is divided into separate longitudinally-extending chambers as in the case of the first form of the apparatus. The envelope 1 is associated in sealing relation with the member 11 through the intermediary of elastic numbers (not shown), of rubber for example. The member 11 is connected to a mechanism 12 which gives to it a suitable alternating back and forth movement. This movement is applied in such manner that when the member is moved in the direction opposed to the liquid current, the solids reposing on the bottom have a tendency to be entrained by friction while in moving in the opposite direction their inertia is opposed to their movement into the liquid current. The member 11 may include a number of embossments 11'. At the upstream extremity of the conduit there is provided a discharge outlet 13 into which the heavier fraction is caused to fall during the operation of the apparatus.

The functioning of the apparatus represented according to Fig. 3 is as follows: the bottom member 11 is given alternating back and forth impulsions by suitable means designated 12. A constant flow or discharge of water is fed to the conduit from 3 (arrow $F_1$). The crude materials are fed in a continuous manner from the hopper 5. A dune is formed at the right and a little downstream from the hopper 5. The dune is agitated with a rubbing movement of the particles with respect to one another in the direction of the arrows $F_4$. The lighter particles escape on the one side of the dune and are discharged at the downstream point 4 and then segregated from the water which passes out therewith at the end of the conduit. On the other hand, the heavier particles are carried along on the bottom member 11 toward the point of withdrawal 13 whence they can be discharged (arrow $F_5$) in a continuous or discontinuous manner. These heavier particles have leaped over the embossments 11' of which the object is to briefly return the particles of the material being sorted to a suspended state in order to facilitate the entrainment by the water current of any lighter stray particles.

We shall now refer to Fig. 4 where the arrangement is similar to that which has just been described in reference to Fig. 3. It will be seen in Fig. 4 that 1 is the sorting conduit, $F_2$ the feeder of the crude materials to the hopper 5, $F_1$ the feeder of make-up water to the conduit 1, and 4 is the discharge outlet for the lighter particles, $F_5$ is the drawoff passage for the heavier particles and $F_4$ is the dune.

In the arrangement of Fig. 4 means are provided for the purpose of avoiding disturbances due to any variation of the quantity of water withdrawn at $F_5$. This means insures introduction systematically into the apparatus of a quantity of water equivalent to that withdrawn. In the example represented, the passage $F_5$ through which the heavy material is withdrawn is connected to a vertical column P. This column is of the airlift type and an injection of air at its base insures the lifting of the heavy particles and the water that has been withdrawn. The mixture of air, water and the heavy particles is discharged onto an inclined grille E superimposed upon a hopper connected to a supplementary liquid supply duct for returning the water discharged onto the grille to the feeding basin G which also receives makeup water through the pipe $F_1$. In this manner the heavy particles are collected on the grille E while the water withdrawn with them is returned to the basin G.

In another modification (Fig. 5) the general arrangement of the sorting conduit and the water connections thereto is the same as that which has just been described in reference to Fig. 4. It will be noted that 1 is the sorting conduit, G is the basin for feeding water to this conduit, P is the airlift column which assures the lifting of the heavy particles on to the grille E and from which the water withdrawn therewith is returned to the basin G, and 5 is the feeding chamber for introducing the crude material into the conduit 1, but here the feeder $F_2$ is of the hydraulic type and feeds the chamber 5 with water as well as with crude material. This disposition is especially advantageous when the crude material to be treated has already been mixed with water.

The water discharge into the system by the feeder $F_2$ by way of the hopper 5 contributes to the sorting in the conduit 1 at the same time as the water is admitted from the basin G. This last discharge is therefore chosen so that it appropriately complements through its introduction upstream that which is introduced through 5 and gives a total supply passing through the conduit that insures an optimum or constant value for the sorting.

As will be seen from Fig. 5 the discharges of water provided through receiving chamber 5 and the basin G are introduced in parallel at R into the downstream section of the conduit adjacent the dune $F_4$. The cross-sectional dimensions shown as L, M and N, are chosen with precision and with relation to the proportion of heavy to crude material and the proportion of water G to total water, all with a view to a suitable sorting in each particular case.

The water admitted at $F_2$ with the crude prdoucts may also be dirty and normally it will be desired to recycle into the feeder a part of the water withdrawn with the light material at 4. On the other hand, it is of interest to provide for introducing make-up water at $F_1$ into the basin G. This water should be as clean as possible. The heavy material separated from the dune $F_4$ and passed along into the section of the conduit upstream from R is brought into contact with the relatively clean water supplied from G and, having been substantially freed from the light particles even those that are of the finest nature, it may be separated from the water associated therewith by use of a grille E that is in the form of a screen that is very tight or fine.

It will be understood, and this also applies to the other modifications, that the apparatus of Fig. 5 can be regulated so as to bring about a granulometric sorting.

Fig. 6 shows another form of possible embodiment of the apparatus in which the bottom of the conduit is constituted by a travelling belt type conveyor as in the case of the apparatus shown in Fig. 1. The particular difference and points of further novelty of this new modification are as follows: the downstream part of the conduit is substantially longer and comprises a portion 14 of increased cross-section which produced a decrease in the linear velocity of the current so that there forms at D a second dune bringing about re-washing of the light particles that present themselevs at that point (arrow $F_6$). From this second dune there esacpes in the downstream direction the lighter particles which are entrained as previously described toward the discharge opening 4 but there also is an escape in the opposite direction of heavy particles which are carried on the moving belt conveyor toward the first dune formed at the zone A where they join the other heavy particles in that zone and accompany them in moving toward th upstream end of the apparatus under the entraining action of the moving belt conveyor (arrow $F_3$). In the case of a material which is difficult to separate, one can provide several places along the conduit in which the section will be increased all with a view to permit the formation of several washing dunes. Similarly, one may provide in the upstream part of the conduit for the fixation of washing dunes acting on the heavy particles, this fixation being otbained by a local decrease of the section. In determining the section (upstream and downstream), it will be sought to obtain for a determined dune a density of cut different from that which is given for the preceding dune. The products of intermediate density are also partially recycled which favors the precision of the separation.

There has also been represented in Fig. 6 a further variation for the feeding of the apparatus. This avriation consists in immersing the upstream part or tank 3 and giving to the travelling conveyor in the part adjacent to this tank 3 an inclination of such sort that the upper run of the conveyor will raise above the level of the water the heavy products which are entrained by it. This involves the use of guiding pulleys 15 and 15'. For this purpose, the pulley 15' is provided with a flexible cover and longi-tudinal passages destined to permit the transfer of the solid particles entrained by the belt conveyor.

In Fig. 7 there is represented an example of an application of apparatus according to the invention which includes a circuit for washing the coal. Apparatus according to the invention is fed with crude coal by the feeder 6 emptying into the hopper 5. As indicated, the sorting conduit of this apparatus is substantially similar in construction to the sorting conduit shown in Fig. 1 of the drawings and like the latter includes top and side walls and a supporting surface formed by a traveling belt type conveyor. The cross sectional dimensions of the passageway defined by the top and side walls and the upper run of the conveyor belt are determined by the quantity of crude coal per hour to be supplied thereto by the feeder 6 and the quantity of water per hour that is required to wash such coal. For example, it has been found that in the practice of the invention with apparatus such as shown in Fig. 7, approximately 10 cubic meters of water per hour are needed to wash one ton of crude coal per hour of a fineness less than 10 mm. As a result of such washing operation, approximately 80% of the crude coal will be recovered with the water as cleaned coal while the remainder of the crude coal, approximately 20% thereof, which is principally in the form of schist, will be separated out. Consequently, if apparatus of the type shown in Fig. 7 is to treat 100 tons of such crude coal per hour, the cross sectional dimensions of the referred to passageway should be chosen so that it is capable of handling 100 tons of coal per hour at the hopper 5 and is enabled to deliver 1,000 cubic meters of water and approximately 80 tons of cleaned coal at the downstream end 4 of such passageway during each hour the apparatus is in operation. As has been explained, the water is fed through the passageway at a velocity which is intermediate the mean velocity limits of deposit of the constituents of the mixture that are to be sorted into separate fractions, namely, the coal particles and the heavier schist particles. The velocity of the water is preferably such as to cause the heavier schist particles in the mixture discharged by the hopper 5 into such flow of water to deposit on the upper run of the belt at a place a little downstream from the hopper 5. In the working of the process, the speed at which the belt is driven is related to the velocity of flow of the water and should be such that the combination of forces resulting from the movement of the top run of the belt counter to the flow of the water and the velocity of flow of the water cause the particles depositing on the belt to form on the upper run thereof a dune that is maintained in substantially fixed position at such place of deposit and is constantly agitated and stirred within itself so that the lighter coal particles which may have become eentrapped in the dune by the depositing schist particles are released from the dune to the fluid flow and are carried downstream from the dune. The heavier schist particles on the other hand, are carried upstream from the dune by the upper run of the belt. The heavy particles composed almost entirely of the heavy schists which are carried upstream from the dune by the belt are discharged into a decantation vessel 13a. The lighter coal particles carried downstream by the water pass off at the downstream end 4 to a vibrating washing screen 16 from which there is discharged at 18 the moist coal that has been appropriately deslimed and dewatered. The water of entrainment and the slimes are collected in the vessel 20. The heavy schists which are discharged into the bottom of the decantation vessel 13a are entrained into a conduit 21 in the direction $F_7$ thanks to an addition of fresh water passing into this pipe at 22. The current of water and of schist entrained thereby is transmitted to a vibrating screen 17 from which the deslimed and dewatered schists are discharged. The water and the slimes are collected in a special vessel or in the same vessel 20 as the water and the slimes coming from the washing circuit. Through the intermediary of a helical pump 26 having a regulable constant discharge and the conduit 25, the water from the vessel 20 is returned in the direction $F_8$ into the feeding chamber 3 of the purifying apparatus. The regulation of the feeding of water from the several elements of the circuit is assured by float valve 23 of which the function is to inject into the conduit 25 an increment of water 24 such that the level of the water in vessel 20 is constant. A part of the slimes contained in the water which passes into the vessel 20 are withdrawn from the lower part of this vessel and can be submitted to any suitable later treatment.

By way of non-limitative example, let us assume a possible balance sheet (or schedule) for a circuit treating 100 tons of crude coal per hour of a fineness minus 10 mm. and containing 10% of particles smaller than 0.3 mm. Assuming that a volume of 100 grams per liter of a diameter below 0.3 mm. is introduced into the water of circulation, it will be necessary to withdraw at the base of the vessel 20, 100 cubic meters per hour (or 10 tons per hour of solids at 100 grams per liter). The supply of the circulation water will be of the order of 1,000 cubic meters per hour (or 10 cubic meters per ton). The addition of fresh water required will be in the neighborhood of 100 cubic meters per hour if account is taken of the water optionally carried or associated with the crude material and the water entrained by the discharged products.

We claim:

1. The method of separating a mixture of particulate solid materials into a plurality of fractions differing according to their differences of density and/or particle size which comprises introducing said mixture into a fluid passing under head through a closed conduit filled therewith, regulating the velocity of flow of said fluid so that at a predetermined place in said conduit it is intermediate the mean velocity limits of deposit of the constituents of said mixture that are to be sorted into separate fractions and causes part of the constituents of said mixture to deposit on to a supporting surface within said conduit, simultaneously moving said supporting surface in countercurrent relation to the fluid flow that it coacts with the latter to cause the depositing constituents to form on such surface at said predetermined place a dune that is constantly agitated within itself, the combined action of the velocity of flow of the fluid and the counter-current movement of said surface maintaining the position of said dune within said conduit substantially fixed at said predetermined place, and while feeding said mixture to said flow for replenishing said dune, withdrawing lighter or smaller constituents of said mixture downstream with respect to said dune and moving heavier or larger constituents upstream away from said dune to a point of separate discharge.

2. A method according to claim 1, in which a mixture of particulate solid materials is fed continuously into said fluid flow and the supporting surface for said dune is moved continuously in countercurrent relation to the fluid flow.

3. A method according to claim 1, in which the supporting surface for said dune is moved in a path substantially parallel to the direction of fluid flow alternatively back and forth so as to contribute to the formation of a dune substantially fixed with respect to the point of introduction of the crude mixture to the fluid flow.

4. A method according to claim 1, in which the fluid passed through the sorting conduit is a liquid such as water.

5. Apparatus for separating a mixture of particulate solid materials into a plurality of fractions differing according to their differences of density and/or particle size, comprising a closed conduit, that is stationary as a whole to provide a substantially fixed passageway for a flow of liquid and having a lower side without substantial openings therein throughout the length of such fixed passageway means for establishing in said conduit a fluid flow in one longitudinal direction thereof under a predetermined head, said conduit including means providing a supporting surface at the lower side of and within said conduit for solid particles settling within said fluid, and means supporting said surface means for movement longitudinally of said conduit, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, said conduit being so configured in the region of said point that with the fluid head established by said flow means the fluid flow past said point is given such velocity that part of the constituents of said mixture deposit on said supporting surface, and means for moving said supporting surface longitudinally of and relatively to said conduit and oppositely to the direction of fluid flow, said moving means being constructed and arranged to impart such an upstream movement to said supporting surface that the combined action of such surface movement and the fluid flow established by said flow means and conduit causes the depositing particles to form a sorting dune at a predetermined place relative to said supporting surface, maintains the position of said sorting dune substantially fixed within said conduit at said place of deposit, and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor, and means at said upstream point of discharge to enable withdrawal of the particles arriving thereat from said conduit.

6. Apparatus according to claim 5, wherein said supporting surface is mounted on said supporting means for movement back and forth in a path substantially parallel to the path of flow of said fluid through said conduit.

7. Apparatus according to claim 5, wherein the conduit except at said place of deposit is of generally uniform cross-section from one end to the other thereof and at said place of deposit has a cross-sectional area substantially different from that of the remainder of the conduit.

8. Apparatus for separating a mixture of particulate solid materials into a plurality of fractions differing according to their differences of density and/or particle size, comprising a closed conduit having a lower side without substantial openings therein throughout the length of such closed conduit, means for establishing in said conduit a fluid flow in one longitudinal direction thereof under a predetermined head, means providing a supporting surface at the lower side of and within said conduit for solid particles settling within said fluid, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the section of said conduit extending in the downstream direction from the point of introduction thereto of the materials that are to undergo sorting having a cross-section greater than the cross-section of said conduit extending upstream therefrom, the fluid flow past said point being of such velocity that part of the constituents of said mixture deposit on said supporting surface, and means for moving said supporting surface longitudinally of said conduit and oppositely to the direction of fluid flow so that the combined action of such surface movement and fluid flow causes the depositing particles to form a sorting dune at a predetermined place on said supporting surface, maintains the position of said sorting dune substantially fixed within said conduit at said place of deposit and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor.

9. Apparatus according to claim 8, wherein the feeding means is adapted to feed the materials that are to undergo sorting in association with a fluid which cooperates in bringing about the fluid flow for the sorting.

10. Apparatus for separating a mixture of particulate solid materials into a plurality of fractions differing according to their differences of density and/or particle size, comprising a closed conduit having a lower side without substantial openings therein throughout the length of such closed conduit, said conduit being stationary as a whole, to provide a substantially fixed passageway for a flow of fluid, means for establishing a fluid flow through said conduit in one longitudinal direction thereof, means at the lower side of the conduit passageway providing a supporting surface for solid particles settling within the fluid, means supporting said surface means for movement longitudinally of said conduit, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the configuration of said conduit in the region of said point varying from the configuration of said conduit adjacent to the upstream end of such region and being such as to provide a fluid flow past said point being of such velocity that part of the constituents of said mixture deposit on said supporting surface, and means for moving said supporting surface longitudinally of said conduit and oppositely to the direction of fluid flow, said moving means being constructed and arranged to impart such an upstream movement to said supporting surface that the combined action of such surface movement and fluid flow causes the depositing particles to form a sorting dune at a predetermined place relative to said supporting surface, maintains the position of such sorting dune substantially fixed within said conduit at said place of deposit, and agitates and stirs said dune to cause the lighter or smaller particles to be separated therefrom and carried downstream by the fluid and the heavier or larger particles to be moved upstream with said supporting surface away from said dune, and means spaced upstream from said dune for enabling the withdrawal from said conduit of the heavier or larger particles so moved upstream.

11. The process of separating constituents of a mixture of solid particulate materials in which one constituent thereof has a greater density and/or particle size than another constituent of said mixture, which comprises continuously introducing said mixture into a fluid flowing in a closed conduit at a predetermined controlled velocity at the place of entry of said mixture, controlling the velocity of flow of said fluid at a portion of the longitudinal path of flow thereof so that the flow of fluid through such path portion shall be at a velocity which is below that required to sustain said one constituent in suspension in the fluid and such as to cause the major part of said one constituent of the mixture entering such path portion to deposit on a supporting surface in such path portion, and which velocity is above that required to entrain said other constituent and such as to enable said fluid to carry the major part of said other constituent of the mixture entering such path portion out of such path portion, and maintaining the velocity of the fluid in such path portion sufficiently high while simultaneously moving said supporting surface counter to the fluid flow so that the combined action thereof cause the depositing particles to form on said surface a substantially fixed dune that is constantly agitated and stirred within itself to release to the fluid flow particles of said other constituent which may have become entrapped in the dune by the depositing particles of said one constituent, the counter movement of said surface being such that during the continuous feed of said mixture to said fixed dune particles of said one constituent are moved upstream away from said dune and out of such path portion by said supporting surface.

12. Apparatus for separating constituents of a mixture of solid particulate materials in which one constituent thereof has a greater density and/or particle size than another constituent of said mixture, which comprises a closed conduit having a lower side without substantial openings therein throughout the length of such closed conduit, means for continuously supplying a fluid to the upstream end of said conduit, means for continuously feeding said mixture of such solid materials into the fluid flowing through said conduit, said feeding means including a hopper connected to said closed conduit so as to form a part thereof enabling the formation therein of a height of fluid corresponding to the pressure on such fluid in said conduit, said conduit including means for controlling the velocity of flow of the fluid at a longitudinal portion of said conduit so that the flow of fluid through such conduit portion shall be at a velocity which is below that required to sustain said one constituent in suspension in the fluid and such as to cause the major part of said one constituent of the mixture entering such conduit portion to deposit out of the fluid, and which velocity is above that required to entrain said other constituent and such as to enable the fluid to carry the major part of said other constituent of the mixture entering such conduit portion out of such conduit portion, means in said closed conduit providing a supporting surface for the particles depositing in such conduit portion, means supporting said surface for movement longitudinally of said conduit means for moving said supporting surface longitudinally of said conduit and oppositely to the direction of fluid flow, said controlling means being operable to maintain the velocity of the fluid in such conduit portion high enough and said surface moving means being operable simultaneously to move said supporting surface counter to the fluid flow so that the combined action thereof cause the depositing particles to form on said surface a substantially fixed dune that is constantly agitated and stirred within itself to release to the fluid flow particles of said other constituent which may have become entrapped in the dune by the depositing particles of said one constituent, said surface moving means providing said surface with such counter movement that during the continuous feed of said mixture to said fixed dune particles of said one constituent move upstream away from said dune and out of such conduit portion by said supporting surface, and means for enabling the deposited particles of said one constituent moved upstream from said fixed dune on said supporting surface to be withdrawn from said conduit.

13. Apparatus for separating a mixture of particulate solid materials into a plurality of fractions differing according to their differences of density and/or particle size, comprising a closed conduit, means for establishing in said conduit a fluid flow in one longitudinal direction thereof under a predetermined head, an endless traveling belt providing a supporting surface at the lower side of and within said conduit for solid particles settling within said fluid and movable in a direction opposed to that of the fluid flow, the lower side of said closed conduit being without substantial openings and said supporting surface of said traveling belt having a length greater than the length of said closed conduit and extending beyond the ends of said closed conduit, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the fluid flow past said point being of such velocity that part of the constituents of said mixture deposit on said supporting surface, and means for moving said supporting surface longitudinally of said conduit and oppositely to the direction of fluid flow so that the combined action of such surface movement and fluid flow causes the depositing particles to form a sorting dune at a predetermined place on said supporting surface, maintains the position of said sorting dune substantially fixed within said conduit at said place of deposit and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor.

14. Apparatus for separating a mixture of particulate solid materials into a plurality of fractions differing according to their differences of density and/or particle size, comprising a closed conduit having a lower side without substantial openings therein throughout the length of such closed conduit, means for establishing in said conduit a fluid flow in one direction thereof under a predetermined head, means providing a supporting surface at the lower side of and within said conduit for solid particles settling within said fluid, said supporting surface being mounted for movement back and forth in a path substantially parallel to the path of flow of said fluid through said conduit, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the fluid flow past said point being of such velocity that part of the constituents of said mixture deposit on said supporting surface, and means for moving said supporting surface longitudinally of said conduit and oppositely to the direction of fluid flow so that the combined action of such surface movement and fluid flow causes the depositing particles to form a sorting dune at a predetermined place on said supporting surface, maintains the position of said sorting dune substantially fixed within said conduit at said place of deposit and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor, said supporting surface being provided with a plurality of raised portions extending crosswise of the length thereof to serve as riffles over which the heavier or larger particles are caused to travel in their movement away from the sorting zone to said upstream point of discharge.

15. Apparatus for separating a mixture of particulate solid materials into a plurality of fractions differing according to their differences of density and/or particle size, comprising a closed conduit having a lower side without substantial openings therein throughout the length of such closed conduit, means for establishing in said conduit a fluid flow in one longitudinal direction thereof under a predetermined head, means providing a supporting surface at the lower side of and within said conduit for solid particles settling within said fluid, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the fluid flow past said point being of such velocity that part of the constituents of said mixture deposit on said supporting surface, and means for moving said supporting surface longitudinally of said conduit and oppositely to the direction of fluid flow so that the combined action of such surface movement and fluid flow causes the depositing particles to form a principal sorting dune at a predetermined place on said supporting surface, maintains the position of said sorting dune substantially fixed within said conduit at said place of deposit and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor, said conduit being provided with at least one local variation of the cross-sectional area thereof for establishing an auxiliary washing dune in spaced relation to the principal washing dune.

16. Apparatus for separating a mixture of particulate solid materials into a plurality of fractions differing according to their differences of density and/or particle size comprising a closed conduit having a lower side without substantial openings therein throughout the length of such closed conduit and provided with a plurality of partitions depending from the upper side thereof to establish separate parallel passages capable of causing the fluid to flow substantially free of parasitic or eddy currents, means for establishing in said conduit a fluid flow in one longitudinal direction thereof under a predetermined head, means providing a supporting surface at the lower side of and within said conduit for solid particles settling within said fluid, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the fluid flow past said point being of such velocity that part of the constituents of said mixture deposit on said supporting surface, and means for moving said supporting surface longitudinally of said conduit and oppositely to the direction of fluid flow so that the combined action of such surface movement and fluid flow causes the depositing particles to form a sorting dune at a predetermined place on said supporting surface, maintains the position of said sorting dune substantially fixed within said conduit at said place of deposit and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor.

17. Apparatus for separating a mixture of particulate solid materials into a plurality of fractions differing according to their differences of density and/or particle size, comprising a closed conduit having a lower side without substantial openings therein throughout the length of such closed conduit, means for establishing in said conduit a fluid flow in one longitudinal direction thereof under a predetermined head, means providing a supporting surface at the lower side of and within said conduit for solid particles settling within said fluid, means for feeding a mixture of said materials into the fluid flow passing through said conduit at a point intermediate the ends thereof, said feeding means including a hopper connected to said closed conduit so as to form a part thereof enabling the formation therein of a height of fluid corresponding to the pressure on such fluid in said conduit, the fluid flow past said point being of such velocity that part of the constituents of said mixture deposit on said supporting surface, and means for moving said supporting surface longitudinally of said conduit and oppositely to the direction of fluid flow so that the combined action of such surface movement and fluid flow causes the depositing particles to form a sorting dune at a predetermined place on said supporting surface, maintains the position of said sorting dune substantially fixed within said conduit at said place of deposit and agitates and stirs said dune to cause the lighter or smaller particles to be separated therefrom and carried along with the fluid to a downstream point of discharge and the heavier or larger particles to be moved with said supporting surface away from said dune to an upstream point of discharge therefor, an airlift column positioned adjacent the upstream point of discharge end of said conduit for receiving a portion of the liquid flow associated with heavier particles discharged therefrom and lifting the mixture of heavier or larger particles and liquid to a point adjacent to the place of entry of the liquid into the conduit, a screen positioned at the said place of liquid entry and means for returning the liquid separated at said screen from said heavier particles to said conduit.

References Cited in the file of this patent

UNITED STATES PATENTS

| | | |
|---|---|---|
| 1,759,940 | France | May 27, 1930 |
| 2,022,585 | Chance | Nov. 26, 1935 |
| 2,082,467 | Prins | June 1, 1937 |
| 2,426,839 | Morris | Sept. 2, 1947 |

FOREIGN PATENTS

| | | |
|---|---|---|
| 9,737 | Great Britain | Mar. 13, 1913 |
| 636,100 | Great Britain | Apr. 19, 1950 |